United States Patent [19]

Hutson, Jr. et al.

[11] 3,716,593

[45] Feb. 13, 1973

[54] HYDROGEN FLUORIDE RECOVERY METHOD

[75] Inventors: Tom Hutson, Jr.; Cecil O. Carter, both of Bartlesville, Okla.

[73] Assignee: Phillips Petroleum Company

[22] Filed: June 22, 1970

[21] Appl. No.: 48,342

[52] U.S. Cl.................................260/653.6, 23/153
[51] Int. Cl.............................................C07c 17/08
[58] Field of Search..................................260/653.6

[56] References Cited

UNITED STATES PATENTS 2,342,677   2/1944   Linn..................................260/653.6
2,417,875   3/1947   Leonard............................260/653.6

*Primary Examiner*—Daniel D. Horwitz
*Attorney*—Young and Quigg

[57] ABSTRACT

A hydrogen fluoride and acid soluble oil mixture is contacted with water, the oil separated therefrom, then reacted with an olefin and the resultant organic fluorides are recovered.

6 Claims, 1 Drawing Figure

PATENTED FEB 13 1973 3,716,593
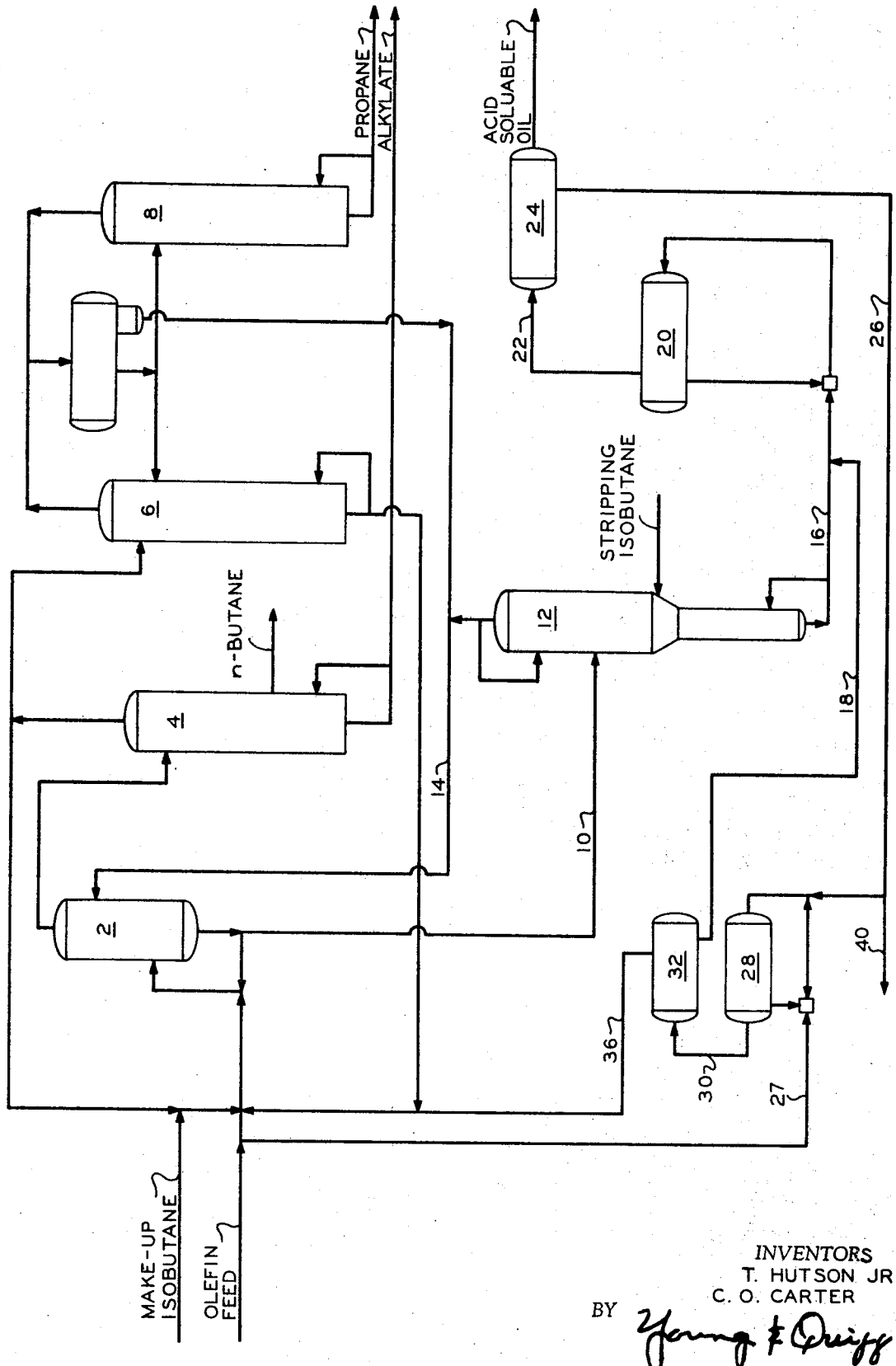
INVENTORS
T. HUTSON JR.
C. O. CARTER
BY Young & Quigg
ATTORNEYS

HYDROGEN FLUORIDE RECOVERY METHOD

In the operation of a hydrogen fluoride alkylation unit, hydrogen fluoride discharging with acid soluble oils are generally considered an economic loss and difficultly disposable waste. Since hydrogen fluoride is valuable, it is desirable to recover it from the discharge of the process.

In this invention, the discharge of acid soluble oil and hydrogen fluoride is contacted with water, separated with water from the oil, reacted with a volume of olefin, and thereafter recovered as organic fluorides. It is therefore an object of this invention to decrease waste of a hydrogen fluoride alkylation unit by recovering hydrogen fluoride discharging from said unit, and to recover an oil substantially free of hydrogen fluoride.

Other aspects, objects, and advantages of the present invention will become apparent from a study of the disclosure, the appended claims, and the drawing.

The drawing is a diagrammatic view of an example hydrogen fluoride alkylation unit and the hydrogen fluoride process equipment of this invention.

Referring to the drawing, the example hydrogen fluoride alkylation unit comprises an alkylation reactor 2, an iso-stripper 4, a depropanizer 6, and a hydrogen fluoride stripper 8. In the alkylation unit operation, an acid soluble oil and hydrogen fluoride stream is passed from the alkylation reactor 2 via line 10 into a hydrogen fluoride rerun column 12. A portion of the hydrogen fluoride is recovered and returned via line 14 to the reactor 2. An acid soluble oil and hydrogen fluoride mixture stream is passed through line 16 for further separation and salvaging of the valuable hydrogen fluoride component.

The acid soluble oil and hydrogen fluoride stream flowing through line 16 is contacted with a stream of water 18 forming a first mixture stream. The first mixture stream is preferably charged into a vessel 20 for thorough mixing of the components, for example, using an eductor-mixer. This first mixture stream then passes from the vessel 20 via line 22 into a first phase separation zone 24. At the first phase separation zone 24 a mixture of water and hydrogen fluoride is separated from the oil portion of the mixture and said water and hydrogen fluoride passes from the separating zone 24 via line 26 as a second mixture stream.

The second mixture stream is reacted with a volume of olefin 27, preferably in a hydrofluorinating reactor 28, thereby forming a third mixture stream. The third mixture stream is thereafter passed via line 30 to a second phase separation zone 32. At the second phase separation zone 32, water is separated from the organic fluorides. The separated water preferably passes via line 18 from the second phase separation zone 32 and is cycled into contact with the acid soluble oil and hydrogen fluoride stream discharging from the rerun column 12. The resultant organic fluorides are recovered from the second phase separation zone 32 and preferably passed via line 36 back to the alkylation reactor for reuse therein.

In order to improve the hydrogen fluoride recovery in the process, it is preferred that the temperature within the second phase separation zone be maintained at about 125° F. and that olefins be reacted with the second mixture stream at an olefin to hydrogen fluoride ratio of about 4. Examples of the olefin that can be utilized with this process is as follows: butene-1, cis- and trans-butene-2, isobutylene, propylene, and amylenes, used separately or as admixtures. A portion of the olefin stream charged to the alkylation unit is one source of the olefin used.

An example of the operation of the example system shown in the drawing is as follows:

EXAMPLE

| Production | | |
|---|---|---|
| Propane | | 1304 bbl/day |
| n-Butane | | 1467 bbl/day |
| Alkylate | | 10,000 bbl/day |
| Acid Soluble Oil (A.S.O.) | | 3037 lbs/day |
| Alkylation Reactor Area | | |
| Reactor temperature | | 95° F. |
| Reactor pressure | | 130 psig |
| Isobutane/olefin volume ratio | | 13.7 |
| Olefin Charge | | 9547 bbl/day |
| Composition | Total charge Wt. % | Paraffin free Wt. % |
| Propane | 10.5 | — |
| Propylene | 17.2 | 29.4 |
| Isobutane | 13.1 | — |
| n-Butane | 13.1 | — |
| Butenes | 35.7 | 61.1 |
| Isopentane | 4.3 | — |
| n-Pentane | 0.5 | — |
| Amylenes | 5.6 | 9.5 |
| Total | 100.0 | 100.0 |
| Make-Up Isobutane | | 5702 bbl/day |
| Composition | | Wt. % |
| Propane | | 0.7 |
| Isobutane | | 95.3 |
| n-Butane | | 4.0 |
| Total | | 100.0 |
| Recycle Isobutane | | 78685 bbl/day |
| Composition | | Wt. % |
| Propane | | 4.1 |
| Isobutane | | 87.7 |
| n-Butane | | 8.0 |
| Isopentane | | 0.2 |
| Total | | 100.0 |
| HF Acid Rerun Area | | |
| HF Acid Charged to Rerun | | 562407 lbs/day |
| Composition | | Wt. % |
| Light hydrocarbons (in solution) | | 7.76 |
| Water | | 4.0 |
| HF Acid | | 87.7 |
| A.S.O. | | 0.54 |
| Total | | 100.00 |
| Stripping Isobutane Charge | | 1410 bbl/day |
| HF Acid Product (Regenerated) to Alkylation | | |
| Reactor | | 554370 lbs/day |
| Composition | | Wt. % |
| Light hydrocarbons (in solution) | | 7.87 |
| Water | | 3.88 |
| HF Acid | | 88.25 |
| A.S.O. | | 0 |
| Total | | 100.00 |
| Stripping Isobutane to Alkylation Reactor (separate phase) | | 1410 bbl/day |

HF Acid Extraction Area
Kettle Bottoms (16) from HF Rerun Column

| Component | Lbs/day | Wt. % |
|---|---|---|
| Water | 1000 | 12.4 |
| HF Acid | 4000 | 49.8 |
| A.S.O. | 3037 | 37.8 |
| Total | 8037 | 100.0 |

Recycle Water (18) to HF Extractor

| Component | Lbs/day | Wt. % |
|---|---|---|
| Water | 1210 | 92.1 |
| HF Acid | 104 | 7.9 |
| Total | 1314 | 100.0 |

Oil Phase from Extractor

| Component | Lbs/day | Wt. % |
|---|---|---|
| Water | 0.3 | 0.01 |
| HF Acid | 0.6 | 0.02 |
| A.S.O. | 3037.0 | 99.97 |
| Total | 3037.9 | 100.00 |

Water-Acid Phase (26) from Extractor

| Component | Lbs/day | Wt. % |
|---|---|---|
| Water | 2210 | 35.0 |
| HF Acid | 4104 | 65.0 |
| Total | 6314 | 100.0 |

Hydrofluorination Reactor Charge Streams
(1) Olefin Feed (27) (353 BPD)          71076 lbs/day
(2) Water-Acid Phase (26)
    Water              2210 lbs/day

| | | |
|---|---|---|
| HF Acid | 4104 lbs/day | |
| Total | 6314 | 6314 lbs/day |
| Effluent Streams | | |
| (1) Hydrocarbon + Water + Organic Fluroides | | 75067 lbs/day |
| (2) Recycle Water + HF (18) | | |
| Water | 1210 lbs/day | |
| HF Acid | 104 | |
| Total | 1314 | 1314 lbs/day |
| (3) Product Water (40) | | |
| Water | 929 lbs/day | |
| HF Acid | 80 | |
| Total | 1009 | 1009 lbs/day |
| (4) Product Organic Fluoride + Unreacted Olefin Stream (36) | | 74967 lbs/day |
| Process Conditions for Hydrofluorination (28) Reactor | | |
| Reactor temperature | | 125° F. |
| Reactor Pressure | | 180 psig |
| Olefin-to-HF mole ratio | | 4.0 |
| HF Loss, lbs/bbl alkylate | | 0.008* |
| Conversion of Olefin to Fluroides | | About 25 mole% |
| Olefin stream charged to hydrofluorination Reactor (Fraction of Total Olefin Stream) | | 3.7 vol. % |

* Note: In plants without a recovery step on the acid soluble oil, the hydrogen fluoride losses are in the range of 0.3 to 0.155 lbs. per bbl. of alkylate. This represents a decrease in acid losses of 94.8 to 97.3 percent.

In most operations, it may be desirable to bleed off a portion of water 18, e.g., to prevent any buildup of water charged to the system by way of the acid soluble oil stream. Makeup water can also be added to the system. This water stream 40 can be neutralized, e.g., with calcium hydroxide.

In some operations, it may be desirable to remove water from the produced organic fluoride containing stream prior to charging same to the alkylation zone.

Other modifications and alterations of this invention will become apparent to those skilled in the art from the foregoing discussion and accompanying drawing, and it should be understood that this invention is not to be unduly limited thereto.

What is claimed is:

1. A method for recovering hydrogen fluoride from an acid soluble oil, and hydrogen fluoride stream discharging from a hydrogen fluoride alkylation unit, comprising:
   separating a major portion of the hydrogen fluoride from the hydrogen fluoride and acid soluble oil stream;
   mixing the acid soluble oil and remaining minor hydrogen fluoride portion with a stream of water and forming a first mixture stream;
   passing the first mixture stream to a first phase separation zone;
   removing water and hydrogen fluoride from the first phase separation zone as a second mixture stream;
   reacting a volume of olefin with the second mixture stream and forming a third mixture stream;
   passing the third mixture stream to a second phase separation zone;
   separating and recovering organic fluorides from the second phase separation zone; and
   recovering acid soluble oil substantially free of water and of hydrogen fluoride from said first phase separation zone.

2. A method, as set forth in claim 1, further including removing a volume of water from the second phase separation zone, said removed water forming the stream of water contacting the acid soluble and hydrogen fluoride stream.

3. A method, as set forth in claim 1, wherein the temperature within the second phase separation zone is maintained at about 125° F.

4. A method, as set forth in claim 1, wherein olefin is reacted with the second mixture stream at an olefin to hydrogen fluoride ratio of about 4.

5. A method, as set forth in claim 1, further including recovering acid soluble oil substantially free of hydrogen fluoride from the first phase separation zone.

6. A method for recovering hydrogen fluoride from an acid soluble oil and hydrogen fluoride stream discharging from a hydrogen fluoride alkylation unit, comprising:
   separating a portion of the hydrogen fluoride from the hydrogen fluoride and acid soluble oil stream;
   passing the separated hydrogen fluoride portion to the hydrogen fluoride alkylation unit;
   mixing the acid soluble oil and remaining hydrogen fluoride with a stream of water and forming a first mixture stream;
   passing the first mixture stream to a first phase separation zone;
   removing water and hydrogen fluoride from the first phase separation zone as a second mixture stream;
   reacting a volume of olefin with the second mixture stream and forming a third mixture stream, said olefin being reacted with the second mixture stream at an olefin to hydrogen fluoride ratio of about 4;
   passing the third mixture stream to a second phase separation zone maintained at a temperature of about 125° F; and
   separating and recovering organic fluorides from the second phase separation zone.

* * * * *